No. 612,522. Patented Oct. 18, 1898.
I. C. & M. C. LANDES.
SIEVE FOR FLOUR BOLTING OR SCALPING MACHINES.
(Application filed July 28, 1897.)
(No Model.) 2 Sheets—Sheet 1.
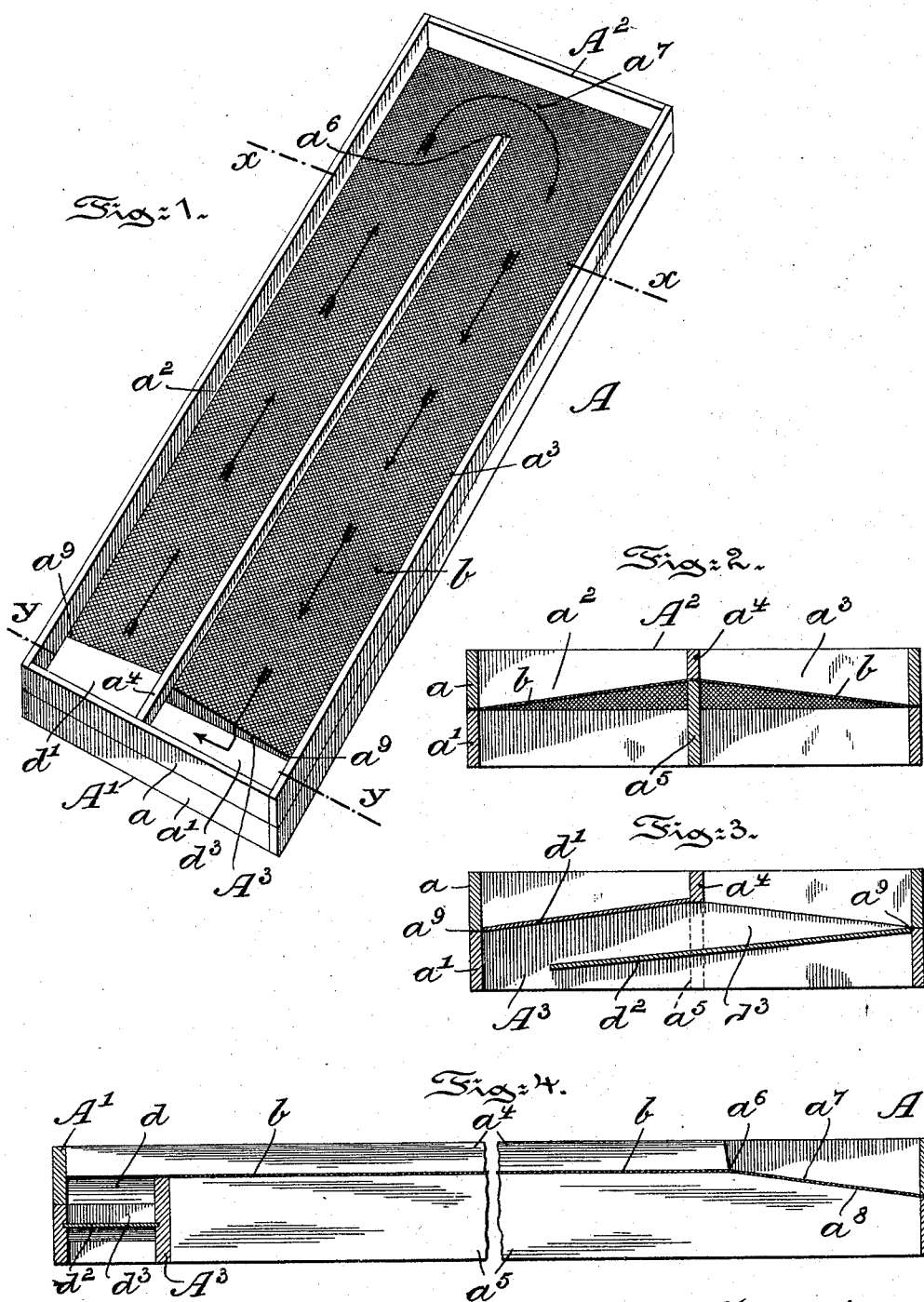

No. 612,522. Patented Oct. 18, 1898.
I. C. & M. C. LANDES.
SIEVE FOR FLOUR BOLTING OR SCALPING MACHINES.
(Application filed July 28, 1897.)
(No Model.) 2 Sheets—Sheet 2.
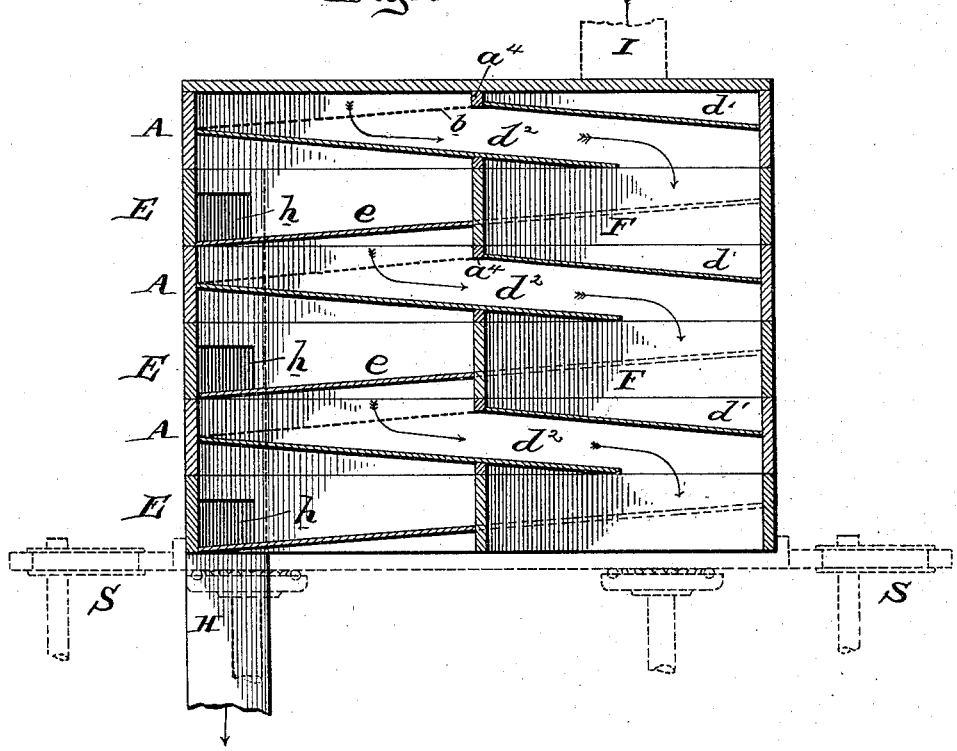
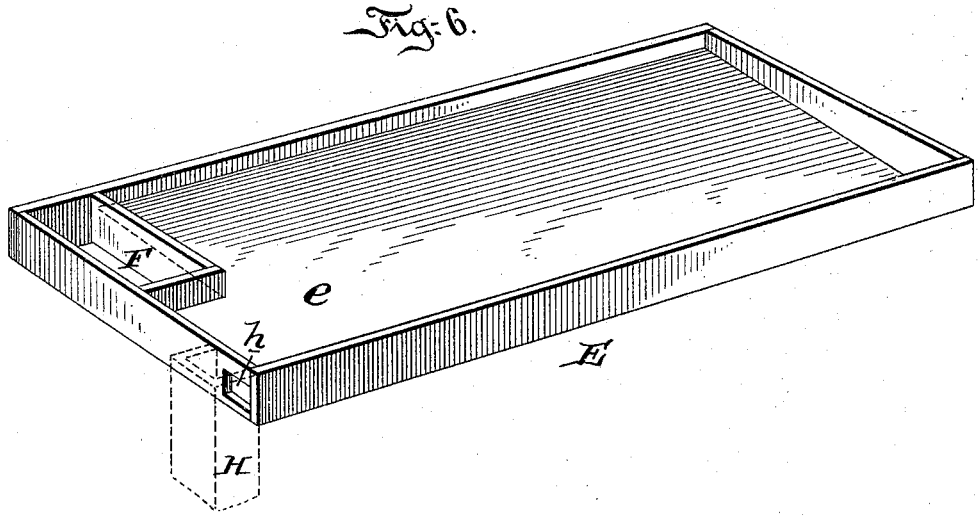

UNITED STATES PATENT OFFICE.

ISAIAH C. LANDES AND MILTON C. LANDES, OF YERKES, PENNSYLVANIA.

SIEVE FOR FLOUR BOLTING OR SCALPING MACHINES.

SPECIFICATION forming part of Letters Patent No. 612,522, dated October 18, 1898.

Application filed July 28, 1897. Serial No. 646,169. (No model.)

*To all whom it may concern:*

Be it known that we, ISAIAH C. LANDES and MILTON C. LANDES, citizens of the United States, residing at Yerkes, in the county of Montgomery and State of Pennsylvania, have invented certain new and useful Improvements in Sieves for Flour Bolting or Scalping Machines, of which the following is a specification.

Our invention has relation to a sieve for gyratory flour-bolting machines, and in such connection it relates to the construction and arrangement of such a sieve.

The principal object of our invention is to provide a sieve wherein the material to be treated is made to travel over the screen from end to end by the gyratory motion of the machine and without the use of flights or carriers; and to this end our invention consists of a sieve comprising a frame of preferably rectangular outline, said frame being divided horizontally by the screen-cloth and also divided longitudinally into two compartments by a bar or strip, the two compartments communicating with each other at one end of the sieve and each compartment having, respectively, at its other end an entrance for the material and an exit for the tails or lighter materials.

Our invention also consists in the arrangement of the screen or sieve cloth, which slants from the longitudinal bar toward the sides of the screen-frame and also slants downwardly toward the end of the frame at that portion where the two compartments communicate.

The nature and scope of our invention will be more fully understood from the following description, taken in connection with the accompanying drawings, forming part hereof, in which—

Figure 1 is a perspective view of a sieve embodying main features of our invention. Fig. 2 is a transverse section on the line $x\,x$ of Fig. 1. Fig. 3 is a transverse section on the line $y\,y$ of Fig. 1. Fig. 4 is a longitudinal sectional view of the sieve. Fig. 5 is a cross-section through a series of the sieves mounted one above the other as used in practice, taken on the line $y\,y$ of Fig. 1; and Fig. 6 is a perspective view of one of the flour-cants which is interposed between the sieves to catch the flour.

Referring to the drawings, A represents the main frame of the sieve, which, as shown, is preferably rectangular in form and divided into two sections $a$ and $a'$, between which the screen or sieve cloth $b$ is securely fastened in any well-known manner. The frame A is divided into two compartments $a^2$ and $a^3$ by the longitudinal bar or strip, which by preference is also formed into two sections $a^4$ and $a^5$, between which the screen or sieve cloth is also confined in any desired manner. The upper section $a^4$ of the longitudinal strip extends from one end A' of the frame to a point $a^6$, which is separated from the opposite end $A^2$ by a space $a^7$ of a width approximately the same as the width of the compartments $a^2$ and $a^3$, and this space $a^7$ forms a means of communication between the two compartments. The lower section $a^5$ of the strip extends from the end $A^2$ of the frame A to a cross-bar $A^3$, which, with the end A', forms a compartment $d$, the purpose of which will be hereinafter explained. The lower section $a^5$ is vertically deeper than the upper section $a^4$, and this difference in depth results in elevating the screen $b$ along the longitudinal strip, so that the screen does not lie horizontally across the frame, but slants from the longitudinal strip toward the sides of the sieve-frame, as indicated in Fig. 2. The upper edge of the section $a^5$, directly below the space $a^7$, is downwardly slanted or beveled, as at $a^8$, to give the screen or sieve cloth $b$ a slant downward to the end $A^2$ of the main frame A, and the upper edge of the cross-bar $A^3$ is beveled from the center toward its ends, as at $a^9$, to permit of the slope of the screen-cloth toward the sides of the frame A. The compartment $d$, formed between the cross-bar $A^3$ and the end A' of the frame, is provided with the two overlapping shelves $d'$ and $d^2$, which form between them the slanting opening $d^3$, through which the tails are discharged.

The screens A are arranged one above the other with interposed flour-cants E, substantially as illustrated in Fig. 5. The series of screens and cants are bolted together to move as a unit, and these are caused to be moved with a gyratory motion by the eccentrics S S, as more fully disclosed in our pending application, Serial No. 644,046, filed July 10, 1897.

The materials enter into the upper sieve at I and fall upon the floor $d'$. From here they are fed over the screen-cloth and at the tail end pass upon the oblique lateral discharging-floor $d^2$, so that the tails from the first screen pass laterally to a position under the closed floor $d'$ and fall by gravity onto the similar closed floor of the next screen below, and this operation is repeated. The materials pass through a tubular aperture F in each of the flour-cants E. The flour passes upon the oblique floor $e$ and is discharged through an aperture $h$ at one corner and passes into a tubular passage-way H, leading to the discharge. The tailings from the machine may be carried off in any suitable manner from the lowest or lowermost oblique laterally-extending floor $d^2$.

The operation of the sieve is as follows: The material is conducted to the upper shelf $d'$, from which it passes onto the screen in the compartment $a^2$, and by reason of the gyration of the machine the material travels over the screen in the direction of the arrows in Fig. 1. The material partially sieved then travels through the space $a^7$ to the compartment $a^3$, and thence to the opening $d^3$, through which the tails are discharged upon a second sieve in series, it being understood that in machines of this character there are a number of superposed sieves separated by a receptacle or cant into which the finer particles fall from the screen and from which the finer particles may be removed. By reason of the slanting of the screen in each compartment, as before explained, the material as the sieve is gyrated travels transversely as well as longitudinally over the screen-cloth.

Having thus described the nature and object of our invention, what we claim as new, and desire to secure by Letters Patent, is—

1. A sieve comprising a frame divided longitudinally into two compartments except for a portion of its length adjacent to one end at which they communicate with each other, an oblique screen-cloth bottom for each of the compartments united at the communicating end, a closed floor formed at the opposite end of one compartment for receiving the material, and a discharge-opening formed at the same end of the other compartment for the discharge of the tails directed under the solid floor of the receiving end of the first-mentioned compartment, all arranged so that in the gyration of the machine the material is caused to traverse each compartment successively and then be discharged laterally into a second screen-frame under the first, substantially as set forth.

2. A sieve comprising an outer frame, a strip arranged relatively to the frame so as in effect to divide it into two longitudinally-arranged compartments communicating with each other only at one end, a screen dividing the frame horizontally into two sections, said screen sloping between the longitudinal strip and the sides and end of the frame at the point where the two compartments communicate, and a slanting discharge passage-way leading laterally and downward from one compartment to a position below the other compartment at its feeding end.

3. A sieve or screen for a bolting-machine having a screen-cloth stretched so that its surface is arranged obliquely, adapted at one place in its surface to receive the materials to be screened and also having a laterally-directed passage-way leading from another distant portion of the screen-surface to direct the materials which do not pass over the screen obliquely downward and laterally to a position substantially under the feeding portion of the screen, whereby a gyrating movement of the screen causes the materials to travel over its surface and then discharge laterally so as to be received upon a similar screen at a lower level and permit the same operation to be repeated.

In testimony whereof we have hereunto set our signatures in the presence of two subscribing witnesses.

ISAIAH C. LANDES.
MILTON C. LANDES.

Witnesses:
FRANK E. ZIMMERMAN,
HARRY H. DETWEILER.